April 4, 1944.   H. C. BURT   2,346,006
SURVEYING INSTRUMENT
Filed Feb. 15, 1943
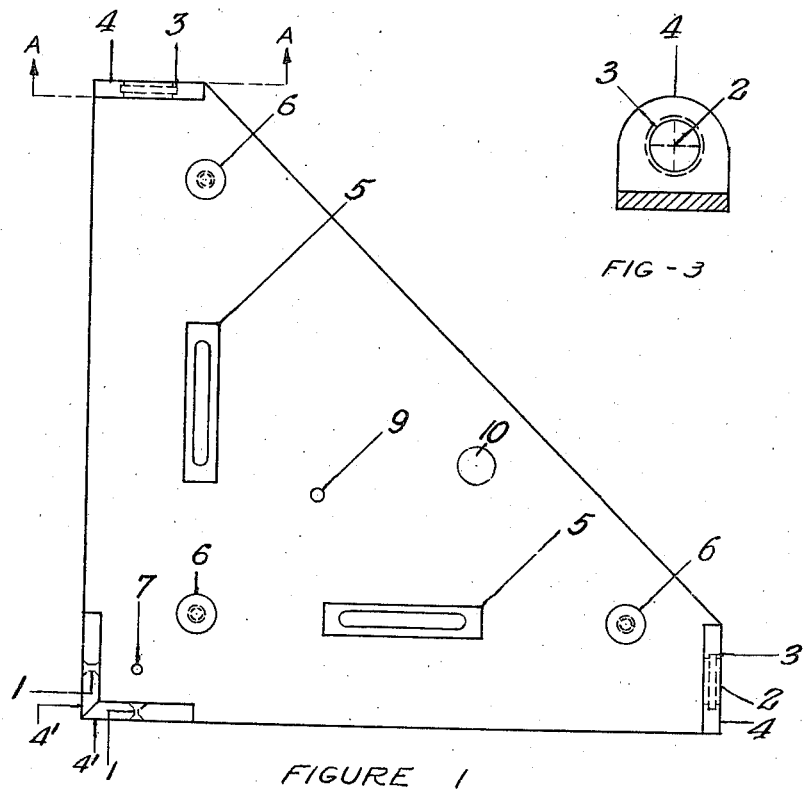
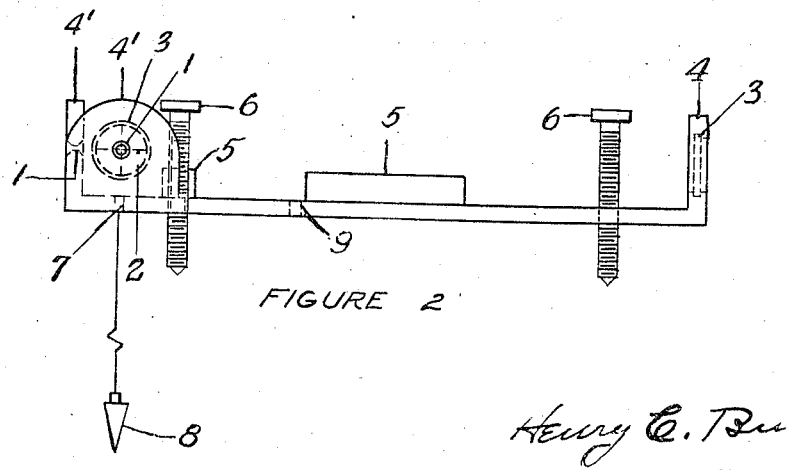
Henry C. Burt
INVENTOR.
BY Patented Apr. 4, 1944

2,346,006

UNITED STATES PATENT OFFICE 2,346,006

SURVEYING INSTRUMENT

Henry C. Burt, Laingsburg, Mich.

Application February 15, 1943, Serial No. 475,977

2 Claims. (Cl. 33—73)

This invention relates to a new and novel instrument, the object of which is to expedite construction work, particularly in the plotting of foundation lines, excavations, etc., where lines at accurate right angles, forming precise square corners are essential and where their levels must be indicated.

This invention provides an inexpensive and accurate instrument that will do much of the work of the standard engineers level or transit without their complications. Objects and advantages of this invention will be apparent during the following description.

In the accompanying drawing, forming a part of this specification, like numbers are employed to designate like parts throughout the same.

Fig. 1 is a top view of the instrument.

Fig. 2 is a side view of the instrument.

Fig. 3, section A.A. is a sectional view of A.A.

This invention shown in the drawing consists of a triangular metal or plastic plate 10, whose base and altitude form a true right angle of ninety degrees at their point of intersection and whose diagonally opposite points along the hypotenuse, terminate in ring sights, 4 and 4, equipped with cross-hairs, 3 and 3, said sights being perpendicular to the plane of the triangular plate 10, and at right angles to each other. The adjacent sides of the base and altitude at their approximate point of intersection, are equipped with peep-sights, 4' and 4', with peephole centers, 1 and 1, at the existing height of the horizontal cross-hairs, 2 and 2, in the ring sights 4 and 4, said sights being perpendicular to the triangular plate 10, and at right angles to each other. Thus it will be seen that each peep-sight is laterally opposite a ring-sight and the centers of all sights are in the same plane, parallel to the plane of the plate 10. The triangular plate 10 is equipped with a plumb-line which passes through the hole 7, at the exact point of intersection of the lines of sight as seen through the centers of the peep and ring sights and terminates in the plumb-bob 8.

5 and 5 are two spirit levels attached to the plate 10 at right angles to each other and in the same plane, whose bubble may be centered by means of three adjustable leveling screws, 6, 6 and 6, threaded through the plate 10, thus indicating when the plate 10 is truly horizontal.

When the plate 10 is truly horizontal, as indicated by the level bubbles resting at their centers, by letting fall the plumb-bob 8, to any desired point, the precise right angle formed by the lines of sight intersecting at 7 may be transferred to any desired surface below the plate 10, and the sides of the right angle extended as desired by means of the peep and ring sights and their levels noted.

As the base and altitude of the triangular plate 10 form a true right angle, the instrument may also be used as a plumb or a square.

9 indicates a small hole through the approximate center of the plate 10 for the purpose of attaching the instrument to a stake when no other support is available.

It is to be understood that slight changes in shape, size, and assembly of parts may be made without departing from the spirit of the invention or the scope of the subjoined claims.

Having thus described my invention, I claim:

1. An instrument of the character described comprising a substantially right triangular base having thereupon fixed pairs of co-acting sights, each pair defining a sight line parallel to a respective side of the triangle, said lines being at right angles to and intersecting each other at the vertex and in a common plane parallel to said base, a plumb-line located at the point of intersection of said sight lines, a pair of levels fixed to said base at right angles to each other, and leveling screws engaging threaded openings in said base and adapted to rest upon any convenient support.

2. An instrument of the character described comprising a substantially right triangular base having thereupon fixed pairs of co-acting sights, each pair defining a sight line parallel to a respective side of the triangle, said lines being right angles to and intersecting each other at the vertex and in a common plane parallel to said base, a plumb-line located at the point of intersection of said sight lines, a pair of levels fixed to said base at right angles to each other, leveling screws engaging threaded openings in said base and adapted to rest upon any convenient support, and means for fixing said base rotatably in relation to said support.

HENRY C. BURT.